United States Patent
Lee et al.

(10) Patent No.: US 10,923,937 B2
(45) Date of Patent: Feb. 16, 2021

(54) CHARGING SYSTEM FOR ECO-FRIENDLY VEHICLE AND CHARGE CONTROL METHOD USING THE SAME

(71) Applicants: Hyundai Motor Company, Seoul (KR); Kia Motors Corporation, Seoul (KR)

(72) Inventors: Seong Min Lee, Gyeonggi-do (KR); Je Hwan Lee, Gyeonggi-do (KR); Ki Jong Lee, Gyeonggi-do (KR); Sang Cheol Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/593,133

(22) Filed: Oct. 4, 2019

(65) Prior Publication Data
US 2020/0335981 A1     Oct. 22, 2020

(30) Foreign Application Priority Data
Apr. 22, 2019    (KR) .................. 10-2019-0046647

(51) Int. Cl.
| B60L 53/14 | (2019.01) |
| H02J 7/00 | (2006.01) |
| B60L 53/60 | (2019.01) |
| B60L 53/31 | (2019.01) |
| H01M 10/44 | (2006.01) |
| B60L 50/51 | (2019.01) |

(52) U.S. Cl.
CPC .............. *H02J 7/007* (2013.01); *B60L 50/51* (2019.02); *B60L 53/14* (2019.02); *B60L 53/31* (2019.02); *B60L 53/60* (2019.02); *H01M 10/44* (2013.01); *H01M 2220/20* (2013.01)

(58) Field of Classification Search
None
See application file for complete search history.

(56) References Cited

U.S. PATENT DOCUMENTS

| 8,274,262 | B2 * | 9/2012 | Harada | ................. | H01M 10/48 320/137 |
| 8,686,591 | B2 * | 4/2014 | Mitsutani | .................. | B60L 1/00 307/10.7 |
| 2011/0169448 | A1 * | 7/2011 | Ichikawa | ................ | B60K 6/365 320/109 |
| 2012/0187919 | A1 * | 7/2012 | Andersson | ............ | B60W 10/26 320/138 |

(Continued)

FOREIGN PATENT DOCUMENTS

KR    20180130246 A    12/2018

*Primary Examiner* — Bentsu Ro
(74) *Attorney, Agent, or Firm* — Mintz Levin Cohn Ferris Glovsky and Popeo, P.C.; Peter F. Corless (57) ABSTRACT

A charging system for an eco-friendly vehicle is provided. The system includes a power supply unit that provides power for charging an automotive battery and a charging unit including a motor and an inverter connected with the motor, and that charges the battery by being supplied with power from the power supply unit. One or more relays connect the power supply unit and the battery to each other and a controller moves a rotor of the motor to a predetermined reference position before charging the battery.

12 Claims, 6 Drawing Sheets

(56) References Cited

U.S. PATENT DOCUMENTS

| | | | |
|---|---|---|---|
| 2013/0009598 A1* | 1/2013 | Ohtomo | H02J 7/0027 320/109 |
| 2013/0308230 A1* | 11/2013 | Ando | B60L 50/51 361/42 |
| 2018/0115180 A1* | 4/2018 | Shin | H02J 7/0068 |
| 2019/0109462 A1* | 4/2019 | Gotz | H02J 7/00047 |

* cited by examiner

FIG. 1

RELATED ART

FIG. 2

RELATED ART

|  | U-PHASE | V-PHASE | W-PHASE |
|---|---|---|---|
| CURRENT | 60A | 41A | 75A |
| INDUCTANCE | 209uH | 385uH | 202uH |
| TEMPERATURE | 115℃ | 105℃ | 120℃ |
| EFFICIENCY | | 98.1% | |

|  | U-PHASE | V-PHASE | W-PHASE |
|---|---|---|---|
| CURRENT | 58A | 60A | 57A |
| INDUCTANCE | 263uH | 270uH | 260uH |
| TEMPERATURE | 114°C | 115°C | 113°C |
| EFFICIENCY | 98.5% | | |

CHARGING SYSTEM FOR ECO-FRIENDLY VEHICLE AND CHARGE CONTROL METHOD USING THE SAME

CROSS-REFERENCE TO RELATED APPLICATION

This application claims the priority benefit of Korean Patent Application No. 10-2019-0046647, filed on Apr. 22, 2019, the disclosure of which is incorporated herein by reference.

BACKGROUND

1. Field of the Invention

The present disclosure relates to a charging system for an eco-friendly vehicle and a charge control method using the same and, more particularly, to a charging system for an eco-friendly vehicle that maintains the temperature of power conversion devices of an inverter constant by performing charging after moving the rotor of a motor to a predetermined reference position before charging a battery using a charging unit including a motor-inverter, and a charge control method using the system.

2. Description of the Prior Art

Figure 1:
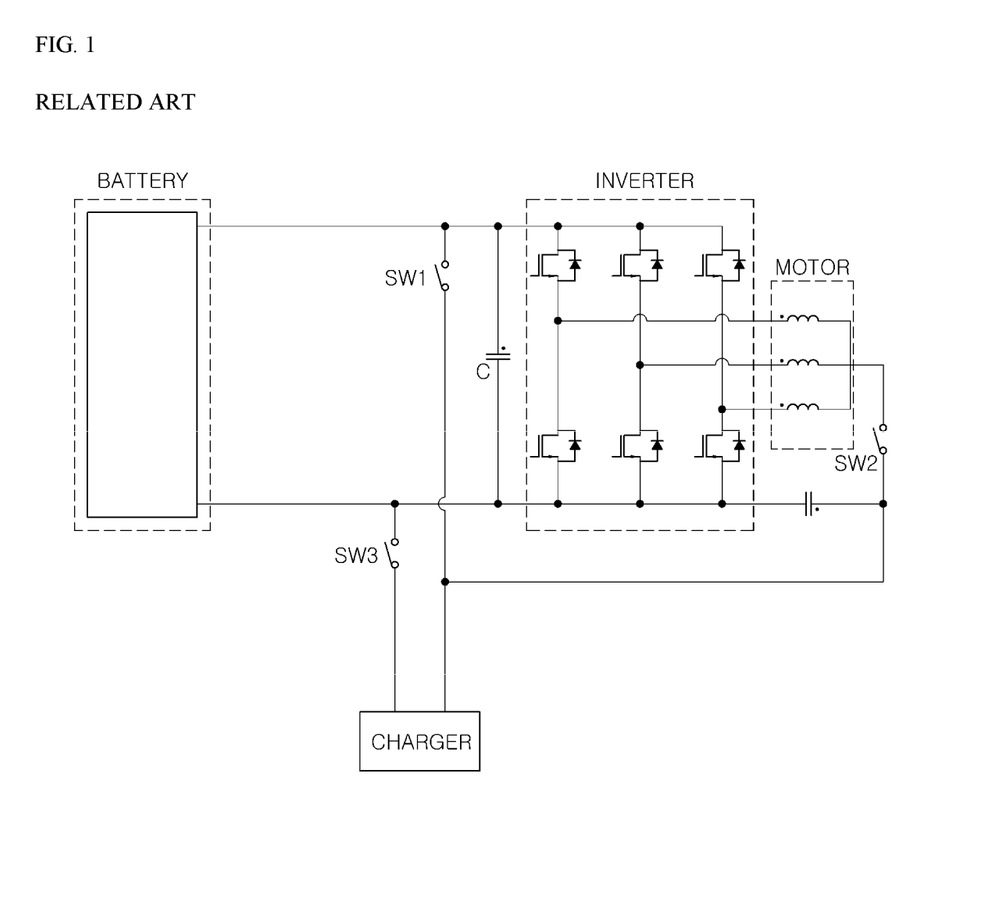
FIG. 1 is a diagram showing a charging system for common vehicles using a motor-inverter in the related art.
Figure 2:
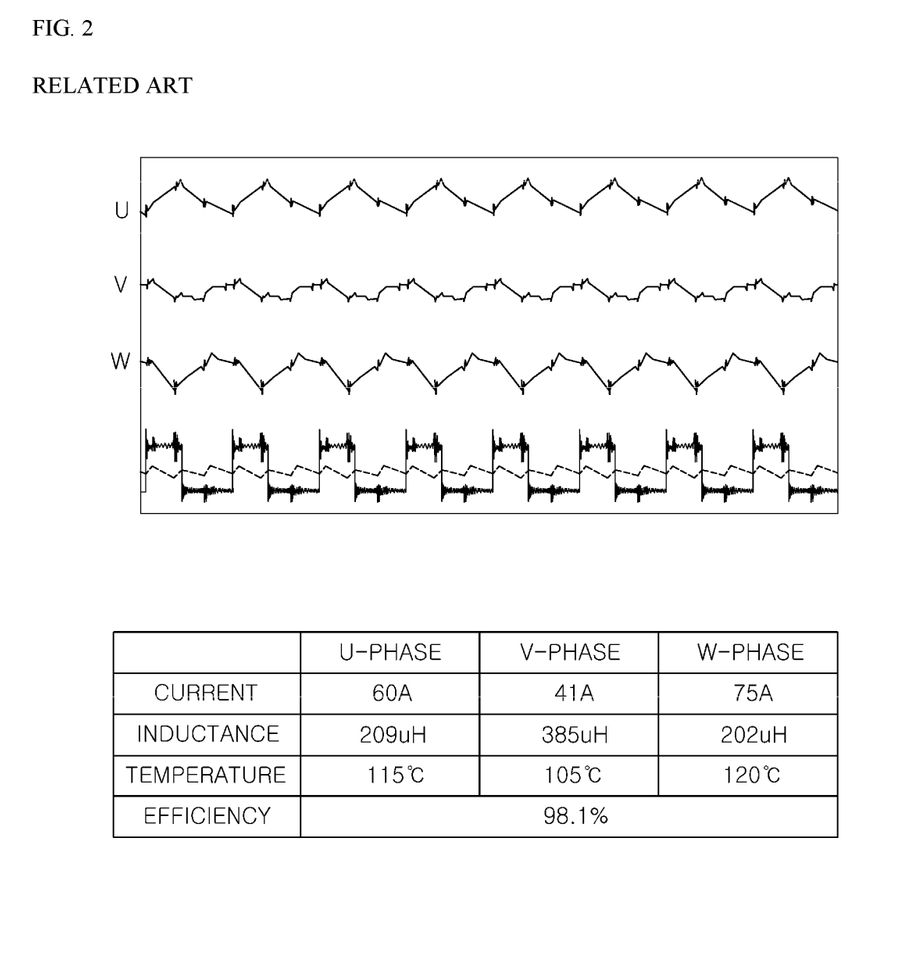
FIG. 2 is a diagram showing the temperature difference of power conversion devices in an inverter due to current imbalance between phases of a motor, generated due to a difference in the inductance of the phases, during charging by a charging system for a vehicle in the related art.

Eco-friendly vehicles such as an Electric Vehicle (EV) or a Plug-In Hybrid Electric Vehicle (PHEV) use Electric Vehicle Supply Equipment (EVSE) installed at a charge station to charge a battery. FIG. 1 is a view showing a charging system for common vehicles using a motor-inverter in the related art. A charging system for a vehicle of the related art is described with reference to FIG. 1.

For example, when a battery has a capacity of 800V and a charger has a capacity of 400V, it may be possible to increase a voltage by 400V through a motor-inverter by turning on a second switch SW2 and a third switch SW3 to charge the battery. When the charger has a capacity of 800V, it may be possible to directly connect the charge to the battery by turning on a first switch SW1 and the third switch SW3 to charge the battery.

Meanwhile, the inductance of the phases of the motor is changed by the position of the rotor of the motor, and accordingly, the current at the phases of the inverter may not be uniform. In particular, when a phase has low inductance, current ripple is excessive, and thus, a current and a loss of the inverter increase and the temperature of power conversion devices of the inverter may increase. When a phase has high inductance, current ripple is minimal, and thus, a current and a loss of the inverter decreases and the temperature of the power conversion devices of the inverter may decrease. In other words, when a difference occurs in the inductance of the phases of the motor, the durability of the inverter may be deteriorated due to the difference in temperature of the power conversion devices of the inverter.

SUMMARY

The present disclosure provides a charging system for an eco-friendly vehicle that may improve the durability of an inverter by maintaining the temperature of power conversion devices of an inverter constant by performing charging after moving the rotor of a motor to a predetermined reference position before charging a battery using a charging unit including a motor-inverter.

In view of the above aspect, a charging system for an eco-friendly vehicle according to the present disclosure may include: a power supply unit configured to provide power for charging an automotive battery; a charging unit including a motor and an inverter connected with the motor, and configured to charge the battery by being supplied with power from the power supply unit; one or more relays connecting the power supply unit and the battery to each other; and a controller configured to move a rotor of the motor to a predetermined reference position before charging the battery through the charging unit.

The motor may be a 3-phase motor and the predetermined reference position may be a position at which the inductances of the phases of the motor are in equilibrium. The charging system may further include: a position detector configured to detect the position of the rotor of the motor; and a storage configured to store reference position information of the rotor of the motor at which the inductances of the phases of the motor are in equilibrium.

The controller may be configured to compare the position of the rotor detected by the position detector and the reference position stored in the storage, and when the detected position of the rotor and the reference position are different, move the rotor to the reference position by rotating the rotor by operating the inverter. The relays may include a first relay and a second relay disposed between the power supply unit and the battery, and a third relay disposed between the power supply unit and the charging unit.

The controller may be configured to turn the relays on or off, and when the battery and the power supply unit have the same capacity, may be configured to charge the battery by turning on the first relay and the second relay to supply power to the battery from the power supply unit. When the capacity of the power supply unit is less than the capacity of the battery, the controller may be configured to charge the battery by supplying power from the power supply unit to the battery after increasing the voltage of the power by turning on the first relay and the third relay.

In view of the above aspect, a charge control method using the charging system for an eco-friendly vehicle may include: comparing the capacity of the power supply unit with the capacity of the battery; moving the rotor of the motor to the predetermined reference position when the capacity of the power supply unit is less than the capacity of the battery; performing on/off control of the relays; and charging the battery by increasing the voltage of the power supplied from the power supply unit through the charging unit and then supplying the power to the battery.

The motor may be a 3-phase motor, and may be connected with an inverter, and the predetermined reference position may be a position at which the inductances of the phases of the motor are in equilibrium. The method may further include storing reference position information of the rotor of the motor such that inductances of the phases of the motor are in equilibrium, before the comparing of the capacity of the power supply unit and the capacity of the battery.

The moving of the rotor of the motor to the predetermined reference position when the capacity of the power supply unit is less than the capacity of the battery may include: detecting the position of the rotor of the motor when the capacity of the power supply unit is less than the capacity of the battery; comparing the detected position of the rotor and the predetermined reference position; and moving the rotor to the reference position by rotating the rotor by operating the inverter when the detected position of the rotor is different from the reference position. In the performing of on/off control of the relays, the first relay and the third relay may be turned on and the second relay may be turned off.

According to the present disclosure, by performing charging after moving a rotor of the motor to a predetermined reference position before charging a battery through a charging unit included in a motor-inverter, it may be possible to maintain the temperature of power conversion devices of the inverter constant, and thus, it may be possible to improve the durability of the inverter.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Furthermore, control logic of the present disclosures may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A charging system for an eco-friendly vehicle according to an exemplary embodiment of the present disclosure is described hereafter with reference to the accompanying drawings.

Figure 3:
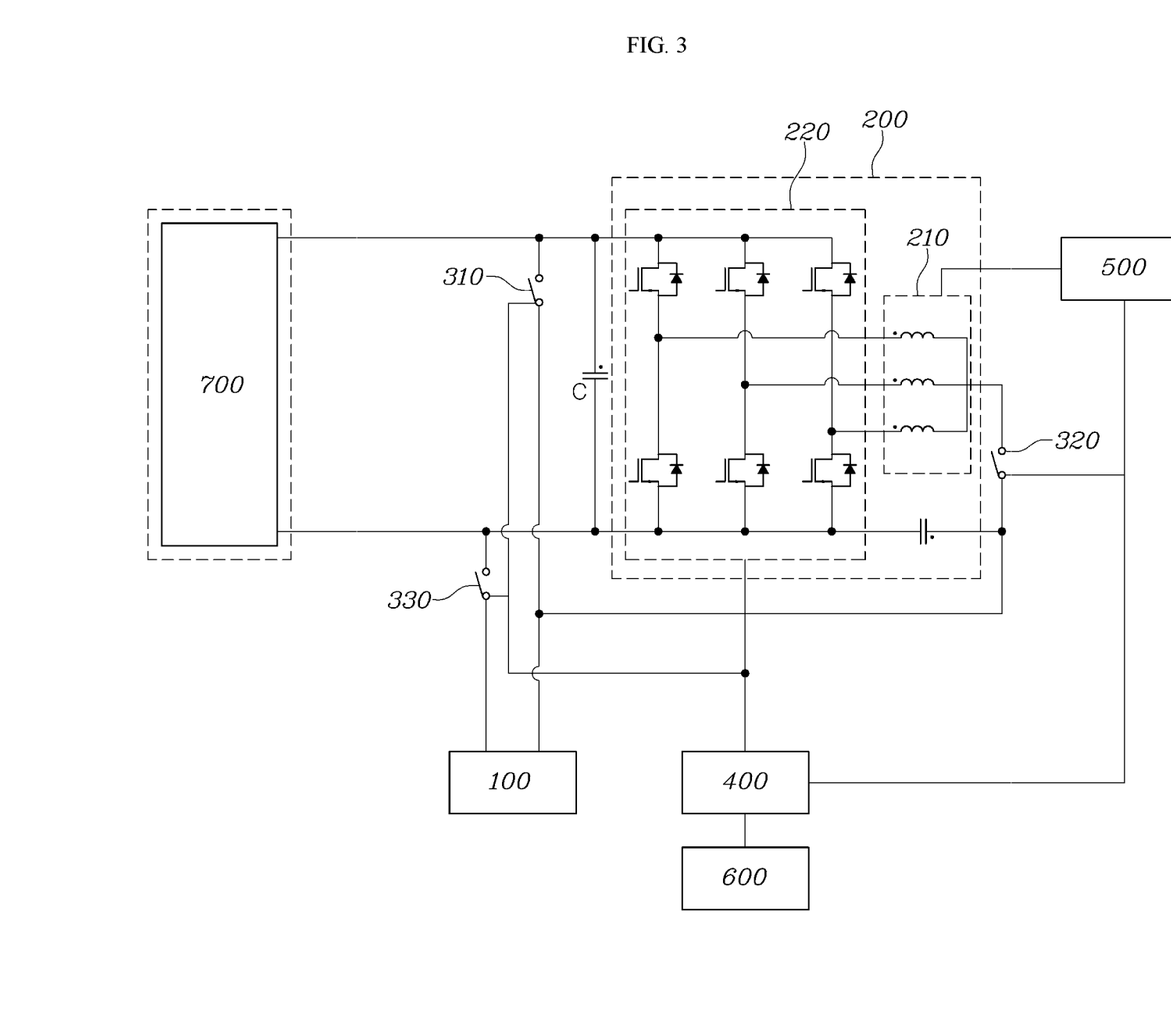
FIG. 3 is a diagram showing a charging system for an eco-friendly vehicle according to an exemplary embodiment of the present disclosure.

As shown in FIG. 3, a charging system for an eco-friendly vehicle according to an exemplary embodiment of the present disclosure may include a power supply unit 100, a charging unit 200, one or more relays 300, and a controller 400, and may further include a position detector 500 and a storage 600. The power supply unit 100 may be configured to provide power for charging an automotive battery 700. Depending on exemplary embodiments, the power supply unit 100 may be Electric Vehicle Supply Equipment (EVSE) at a charge station that provides power for charging automotive batteries.

The charging unit 200 may be configured to charge the battery 700 by being supplied with power from the power supply unit 100. In particular, the charging unit 200 may include a motor 210 and an inverter 220 connected with the motor 210. When the battery 700 has a capacity of 800V and the power supply unit 100 is a charger having a capacity of 400V, the charging unit 200 may be configured to increase the voltage provided from the power supply unit 100 up to 800V through the motor-inverter and provide the increased voltage of 800V to the battery 700, thereby being able to charge the battery 700.

Meanwhile, in the present disclosure, the motor 210 may be a 3-phase motor and the inverter 220 may be configured to receive 3-phase signals from the motor 210 through a plurality of power conversion devices S1~S6 connected to each other in the inverter 220. The 3-phase signals may include an input voltage and an input current that are input at each phase of the motor 210.

The relays 300 may connect the power supply unit 100 and the battery 700 to each other. As shown in FIG. 3, the relays 300 may include a first relay 310 and a second relay 320 disposed between the power supply unit 100 and the battery 700 and a third relay 330 disposed between the power supply unit 100 and the charging unit 200. The first relay 310, second relay 320, and third relay 330 may be turned on or off by the controller 400 to be described below. In particular, the controller 400 may be configured to turn the first relay 310, the second relay 320, and the third relay 330 on or off based on the capacity of the battery 700 and the capacity of the power supply unit 100.

The position detector 500 may be configured to detect the position of the rotor of the motor 210. In particular, the position detector 500 may be a resolver or an encoder. The storage 600 may be configured to store reference position information of the rotor of the motor that generates the inductances at phases of the motor 210 equilibrium. The controller 400 may be configured to charge the battery 700 by performing on/off control of the first relay 310, the second relay 320, and the third relay 330 by comparing the capacity of the power supply unit 100 and the battery 700. In particular, when the battery 700 and the power supply unit 100 have the same capacity of 800V, the controller 400 may be configured to charge the battery 700 by supplying power to the battery 700 from the power supply unit 100 by turning on the first relay 310 and the second relay 320 and turning off the third relay 330.

Additionally, when the capacity of the power supply unit 100 is less than the capacity of the battery 700, the controller 400 may be configured to charge the battery 700 by increasing the voltage of the power, which is supplied from the power supply unit 100, through the charging unit 200 and then supplying the power to the battery 700 by turning on the first relay 310 and the third relay 330 and turning off the second relay 320. For example, when the battery 700 has a capacity of 800V and the power supply unit 100 is a charger having a capacity of 400V, the controller 400 may be configured to charge the battery 700 by increasing the voltage of the power, which is supplied from the power supply unit 100, to 800V and then supplying the voltage of 800V to the battery 700 by turning on the first relay 310 and the third relay 330 and turning off the second relay 320.

When the capacity of the power supply unit 100 is less than the capacity of the battery 700 and the controller 400 may be configured to charge the battery 700 after increasing the voltage through the charging unit 200, the rotor of the motor 210 may be moved to the predetermined reference position before the battery 700 is charged. The predetermined reference position may be a position at which the inductances of the phases of the motor 210 are in equilibrium. Predetermined reference position information may be a test value derived through experimentation and may be stored in the storage 600.

Figure 5:
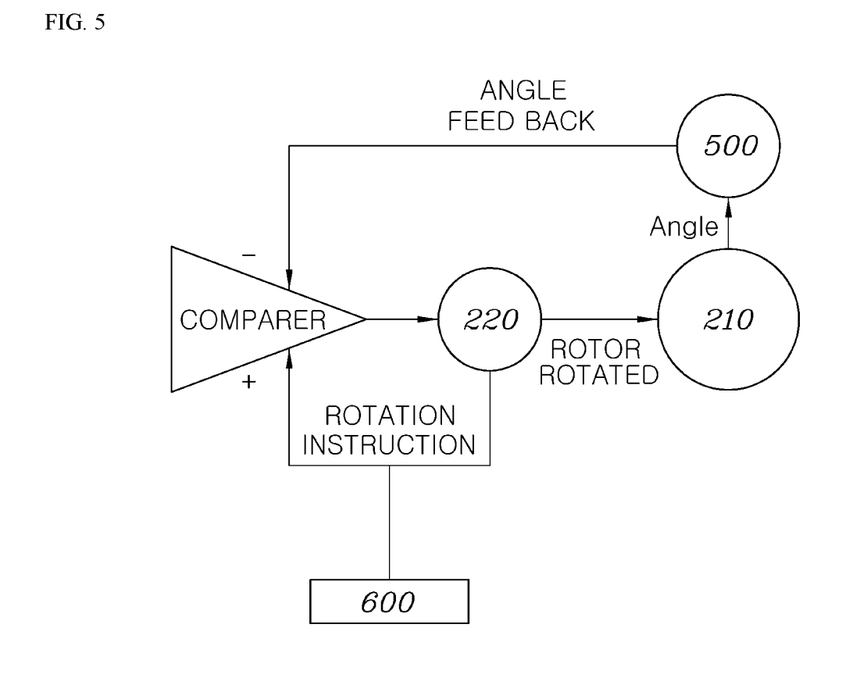
FIG. 5 is a diagram schematically showing adjustment of the position of the rotor of a motor in a controller of a charging system for a vehicle according to an exemplary embodiment of the present disclosure.

Particularly, movement of the rotor of the motor 210 by the controller 400 is described with reference to FIG. 5. When the capacity of the power supply unit 100 is less than the capacity of the battery 700, the controller 400 may be configured to detect the position of the rotor of the motor 210 using the position detector 500, compare the detected position of the rotor with the reference position stored in the storage 600. When the detected position of the rotor and the reference position are different, the controller may be configured to operate the inverter 220 to move the rotor to the reference position by rotating the rotor.

Figure 4:
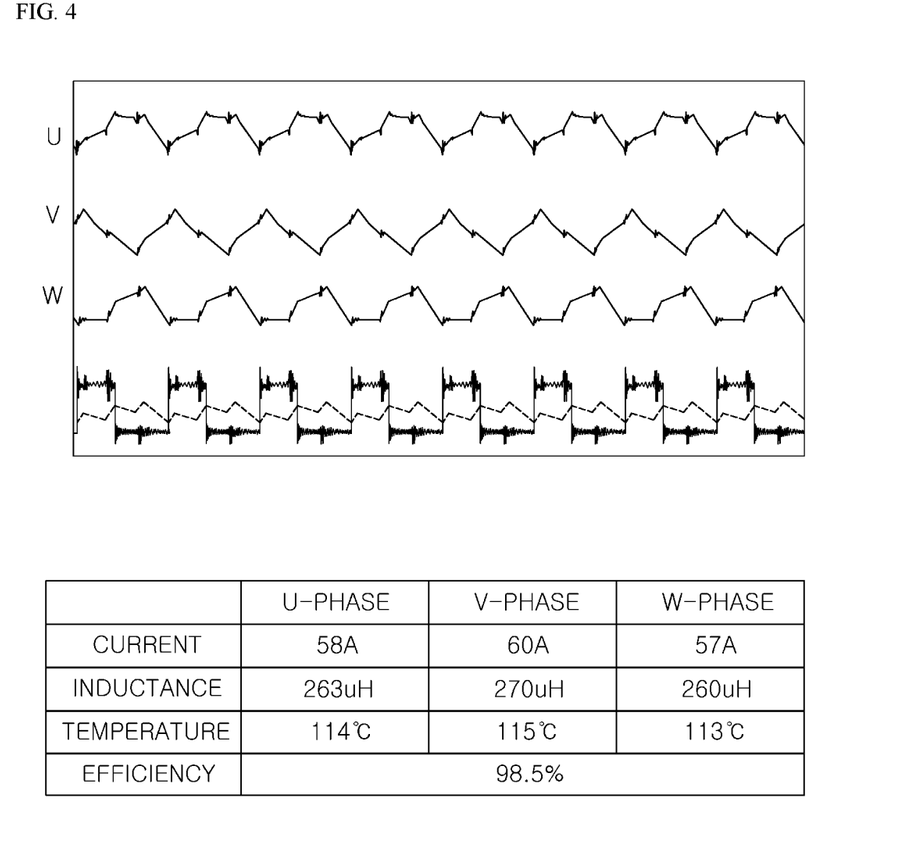
FIG. 4 is a diagram showing the inductance of each phase and the temperature of power conversion devices connected to each phase during charging after a rotor is moved to a predetermined reference position in a charging system for a vehicle according to an exemplary embodiment of the present disclosure.

As described above, in the present disclosure, when the battery 700 is charged after the power provided from the power supply unit 100 is increased in voltage through the charging unit 200 including the motor 210 and the inverter 220, the rotor of the motor 210 is moved to the predetermined reference position by the controller 40 before the battery 700 is charged through the charging unit 200. Accordingly, the inductances of the phases of the motor 210 may be balanced with each other, as shown in FIG. 4, to minimize the current difference at the phases of the motor 210. Further, the temperature difference between the power conversion devices in the inverter 200 connected to the phases of the motor 210 may be minimized, thereby being able to further improve the durability of the inverter 220.

Figure 6:
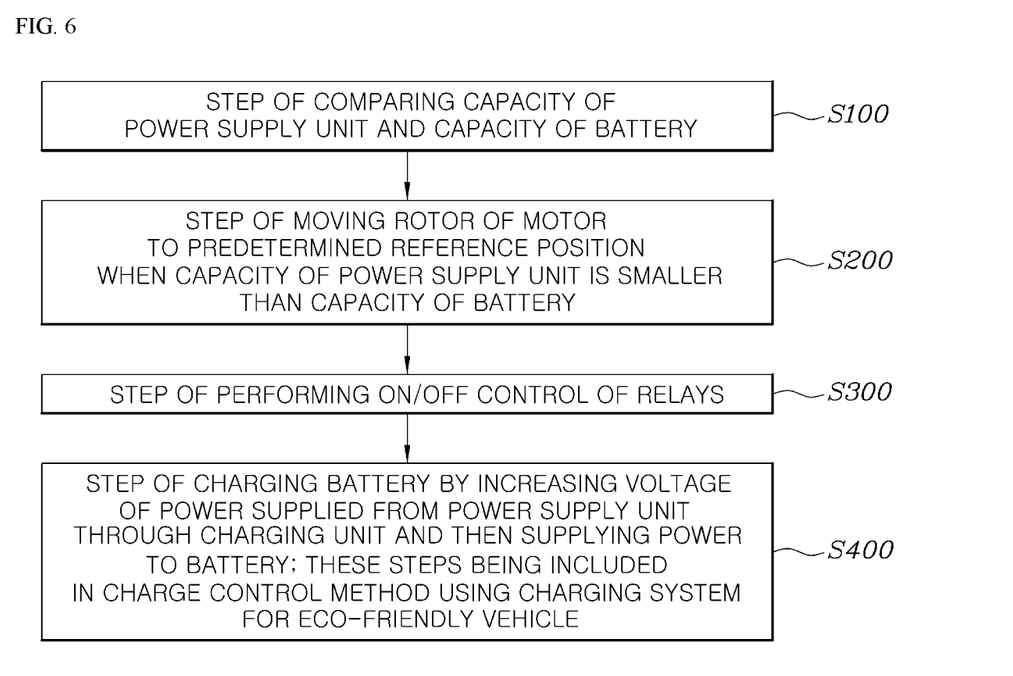
FIG. 6 is a flowchart showing the flow of a charge control method using the charging system for an eco-friendly vehicle according to an exemplary embodiment of the present disclosure.

FIG. 6 is a flowchart showing the flow of a charge control method using the charging system for an eco-friendly vehicle according to an exemplary embodiment of the present disclosure. As shown in FIG. 6, the charge control method using the charging system for an eco-friendly vehicle according to an exemplary embodiment of the present disclosure may include: comparing the capacity of the power supply unit and the capacity of the battery; moving the rotor of the motor to the predetermined reference position when the capacity of the power supply unit is less than the capacity of the battery; performing on/off control of the relays; and charging the battery by increasing the voltage of the power supplied from the power supply unit using the charging unit and then supplying the power to the battery. The motor may be a 3-phase motor and may be connected with an inverter, and the predetermined reference position may be a position at which the inductances of the phases of the motor are in equilibrium. The method may further include storing reference position information of the rotor of the motor such that the inductances of the phases of the motor are in equilibrium, before the comparing of the capacity of a power supply unit and the capacity of a battery.

In particular, the moving of the rotor of the motor to the predetermined reference position when the capacity of the power supply unit is less than the capacity of the battery may include: detecting the position of the rotor of the motor when the capacity of the power supply unit is less than the capacity of the battery; comparing the detected position of the rotor and the predetermined reference position; and moving the rotor to the reference position by rotating the rotor by operating the inverter when the detected position of the rotor is different from the reference position.

Further, in the performing of on/off control of the relays, it may be possible to turn on the first relay and the third relay and turn off the second relay. When the capacity of the power supply unit and the capacity of the battery are the same, it may be possible to turn on the first relay and the second relay and turn off the third relay in the performing of on/off control of relays.

What is claimed is:

1. A charging system for an eco-friendly vehicle, comprising:
   a power supply unit configured to provide power for charging an automotive battery;
   a charging unit including a motor and an inverter connected with the motor, and configured to charge the battery by being supplied with power from the power supply unit;
   one or more relays connecting the power supply unit and the battery to each other; and
   a controller configured to move a rotor of the motor to a predetermined reference position before charging the battery.

2. The charging system of claim 1, wherein the motor is a 3-phase motor and the predetermined reference position is a position at which inductances of phases of the motor are in equilibrium.

3. The charging system of claim 1, further comprising:
   a position detector configured to detect a position of the rotor of the motor; and
   a storage configured to store reference position information of the rotor of the motor at which inductances of phases of the motor are in equilibrium.

4. The charging system of claim 3, wherein the controller is configured to compare the position of the rotor detected by the position detector and the reference position stored in the storage, and when the detected position of the rotor and the reference position are different, move the rotor to the reference position by rotating the rotor by operating the inverter.

5. The charging system of claim 1, wherein the relays include a first relay and a second relay disposed between the power supply unit and the battery, and a third relay disposed between the power supply unit and the charging unit.

6. The charging system of claim 5, wherein the controller is configured to turn the relays on and off, and when the battery and the power supply unit have the same capacity, charge the battery by turning on the first relay and the second relay to supply power to the battery from the power supply unit.

7. The charging system of claim 5, wherein the controller is configured to turn the relays on and off, and when a capacity of the power supply unit is less than a capacity of the battery, charge the battery by supplying power from the power supply unit to the battery after increasing voltage of the power by turning on the first relay and the third relay.

8. A charge control method using the charging system for an eco-friendly vehicle of claim 1, comprising:
   comparing, by a controller, a capacity of the power supply unit and a capacity of the battery;
   moving, by the controller, the rotor of the motor to the predetermined reference position when the capacity of the power supply unit is less than the capacity of the battery;
   turning, by the controller, the relays on and off; and
   charging, by the controller, the battery by increasing a voltage of power supplied from the power supply unit and then supplying the power to the battery.

9. The method of claim 8, wherein the motor is a 3-phase motor and is connected with the inverter, and the predetermined reference position is a position at which inductances of phases of the motor are in equilibrium.

10. The method of claim 8, further comprising:
    storing, by the controller, reference position information of the rotor of the motor such that inductance at phases of the motor is made equilibrium, before the comparing of a capacity of the power supply unit and a capacity of the battery.

11. The method of claim 8, wherein the moving of the rotor of the motor to the predetermined reference position when the capacity of the power supply unit is less than the capacity of the battery includes:
    detecting, by the controller, the position of the rotor of the motor when the capacity of the power supply unit is less than the capacity of the battery;
    comparing, by the controller, the detected position of the rotor and the predetermined reference position; and
    moving, by the controller, the rotor to the reference position by rotating the rotor by operating the inverter when the detected position of the rotor is different from the reference position.

12. The method of claim 8, wherein, in turning the relays on and off, the first relay and the third relay are turned on and the second relay is turned off.

* * * * *